United States Patent
Gröne (10) Patent No.: US 10,987,633 B2
(45) Date of Patent: *Apr. 27, 2021

(54) ROTARY FILTER ARRANGEMENT HAVING A PLURALITY OF HOLLOW SHAFTS

(71) Applicant: GEA MECHANICAL EQUIPMENT GMBH, Oelde (DE)

(72) Inventor: Verena Gröne, Ennigerloh (DE)

(73) Assignee: GEA MECHANICAL EQUIPMENT GMBH, Oelde (DE)

( * ) Notice: Subject to any disclaimer, the term of this patent is extended or adjusted under 35 U.S.C. 154(b) by 481 days.

This patent is subject to a terminal disclaimer.

(21) Appl. No.: 15/771,184

(22) PCT Filed: Oct. 14, 2016

(86) PCT No.: PCT/EP2016/074725
§ 371 (c)(1),
(2) Date: Apr. 26, 2018

(87) PCT Pub. No.: WO2017/071975
PCT Pub. Date: May 4, 2017

(65) Prior Publication Data
US 2018/0326358 A1    Nov. 15, 2018

(30) Foreign Application Priority Data

Oct. 27, 2015  (DE) .................... 10 2015 118 275.0

(51) Int. Cl.
*B01D 33/21*  (2006.01)
*B01D 33/23*  (2006.01)
(Continued)

(52) U.S. Cl.
CPC ......... *B01D 63/16* (2013.01); *B01D 33/0051* (2013.01); *B01D 33/21* (2013.01);
(Continued)

(58) Field of Classification Search
CPC .... B01D 63/16; B01D 33/0051; B01D 33/21; B01D 2313/04; B01D 2313/12;
(Continued)

(56) References Cited

U.S. PATENT DOCUMENTS 1,264,635 A * 4/1918 Graham ................ B01D 33/23
                                                    210/331
2,833,417 A * 5/1958 Steenhagen ............ B01D 50/00
                                                    210/330
(Continued)

FOREIGN PATENT DOCUMENTS

DE        69511772 T2    1/2000
DE    202005018806 U1    4/2007
(Continued)

OTHER PUBLICATIONS

International Search Report dated Feb. 2, 2017 in related International Application No. PCT/EP2016/074725.
(Continued)

*Primary Examiner* — Joseph W Drodge
(74) *Attorney, Agent, or Firm* — Patent Portfolio Buiders PLLC (57) ABSTRACT

A filtration arrangement for a filtration device having a container. The filtration arrangement includes at least two or more hollow shafts, rotatably mounted in a machine frame, on which a plurality of membrane filter disks are arranged. At least one drive device is allocated to the plurality of hollow shafts. Permeate can be discharged from the container through the hollow shafts. Each hollow shaft can be inserted into the container on one of the ends thereof having the plurality of membrane filter disks, such that the opposite end thereof protrudes out of the container. Several or many of the membrane filter disks are arranged axially spaced apart on each hollow shaft, and deformable spacer sleeves are arranged between one part or all adjacent membrane
(Continued)

filter disks and axially space apart the membrane filter disks on the hollow shafts.

23 Claims, 5 Drawing Sheets (51) Int. Cl.
*B01D 63/08* (2006.01)
*B01D 63/16* (2006.01)
*B01D 33/00* (2006.01)

(52) U.S. Cl.
CPC ............ *B01D 33/23* (2013.01); *B01D 63/08* (2013.01); *B01D 2313/025* (2013.01); *B01D 2313/04* (2013.01); *B01D 2313/12* (2013.01); *B01D 2313/14* (2013.01); *B01D 2313/243* (2013.01); *B01D 2315/02* (2013.01); *B01D 2319/04* (2013.01)

(58) Field of Classification Search
CPC .......... B01D 2313/14; B01D 2313/025; B01D 2313/243; B01D 2315/02; B01D 2319/04; B01D 33/215; B01D 33/23; B01D 33/37; B01D 33/68; B01D 33/801; B01D 2313/06; B01D 2313/143; B01D 2313/146; B01D 2313/50; B01D 2317/04; B01D 29/39; B01D 29/395; B01D 29/44; B01D 29/46; B01D 63/08; B01D 63/082; B01D 35/027; B01D 35/0273; B01D 35/0276; B01D 2313/20; C02F 1/44; F04D 1/00; F04D 1/003; F04D 1/04; F04D 13/02; F04D 13/021; F04D 13/12; F04D 13/16; F04D 29/00; F04D 29/02; F04D 29/026; F04D 29/04; F04D 29/0405; F04D 29/043; F04D 29/08; F04D 29/086; F04D 29/10; F04D 29/106; F04D 29/12; F04D 29/60; F04D 29/605; F04D 29/606; F04D 29/607; F04B 23/02; F04B 23/021; F04B 23/025
USPC ............................ 210/321.68, 330, 331, 346
See application file for complete search history.

(56) References Cited

U.S. PATENT DOCUMENTS

| | | | | |
|---|---|---|---|---|
| 3,997,447 A | | 12/1976 | Breton et al. | |
| 4,025,425 A | * | 5/1977 | Croopnick | B01D 63/084 210/637 |
| 4,066,546 A | * | 1/1978 | Sasaki | B01D 35/22 210/193 |
| 4,230,564 A | * | 10/1980 | Keefer | B01D 61/08 210/321.6 |
| 4,655,406 A | * | 4/1987 | Eriksson | D21B 1/30 162/261 |
| 4,728,424 A | * | 3/1988 | Miura | B01D 29/39 210/331 |
| 4,925,557 A | | 5/1990 | Ahlberg, Jr. et al. | |
| 5,044,896 A | * | 9/1991 | Genster | H02K 5/128 417/365 |
| 5,073,262 A | * | 12/1991 | Ahlberg | B01D 33/56 210/321.68 |
| 5,215,663 A | * | 6/1993 | Greene | B01D 63/16 210/321.68 |
| 5,705,068 A | | 1/1998 | Lukkarinen et al. | |
| 5,707,517 A | * | 1/1998 | Rolchigo | B01D 29/055 210/232 |
| 6,416,666 B1 | * | 7/2002 | Salyer | B01D 63/16 210/321.63 |
| 6,808,634 B1 | * | 10/2004 | Zegg | B01D 33/21 210/650 |
| 7,029,584 B2 | | 4/2006 | Blase et al. | |
| 7,163,622 B2 | * | 1/2007 | Zegg | H04R 1/00 210/232 |
| 2003/0183586 A1 | * | 10/2003 | Blase | B01D 33/37 210/784 |
| 2004/0159603 A1 | * | 8/2004 | Boulnois | B01D 65/08 210/331 |
| 2004/0195166 A1 | * | 10/2004 | Gabi | B01D 33/23 210/331 |
| 2007/0056895 A1 | * | 3/2007 | Zegg | B01D 33/23 210/331 |
| 2008/0193276 A1 | * | 8/2008 | Racer | F04D 7/04 415/62 |
| 2009/0159523 A1 | * | 6/2009 | McCutchen | C02F 1/001 210/360.1 |
| 2011/0011785 A1 | | 1/2011 | Herman et al. | |
| 2012/0091060 A1 | | 4/2012 | Hamatschek et al. | |
| 2014/0021134 A1 | * | 1/2014 | Lechuga Andrade | B01D 69/12 210/652 |
| 2015/0190758 A1 | * | 7/2015 | Gadgaard | B01D 69/10 210/483 |
| 2016/0045871 A1 | * | 2/2016 | Liebermann | B01D 33/21 210/321.68 |

FOREIGN PATENT DOCUMENTS

| | | |
|---|---|---|
| DE | 102009010484 A1 | 8/2010 |
| EP | 1323458 A1 | 7/2003 |
| JP | S5471773 A | 6/1979 |
| JP | S6297604 A | 5/1987 |
| WO | 0205935 A2 | 1/2002 |
| WO | 2011033537 A1 | 3/2011 |

OTHER PUBLICATIONS

Search Report created on Jun. 23, 2016 in related DE Application No. 10 2015 118 275.0.
Written Opinion dated Feb. 2, 2017 in related International Application No. PCT/EP2016/074725.

* cited by examiner

Fig. 1d

ROTARY FILTER ARRANGEMENT HAVING A PLURALITY OF HOLLOW SHAFTS

BACKGROUND AND SUMMARY OF THE INVENTION

Exemplary embodiments of the invention relate to a filtration arrangement for a filtration device having a container. The filtration arrangement has at least two or more hollow shafts rotatably mounted in a machine frame, a plurality of membrane filter disks are disposed on each of the hollow shafts. The two or the plurality of hollow shafts are assigned at least one drive device, and the discharge of permeate from the container is performed, or is implementable, respectively, by way of the hollow shafts. One end of each hollow shaft can be introduced, by way of the plurality of membrane filter disks, into the container such that the hollow shafts at the opposite end thereof project externally from the container.

A filtration arrangement of the generic type is known from German patent document DE 10 2009 010 484. Furthermore, German patent document DE 20 2005 018 806 U1 is to be mentioned as being part of the prior art. Furthermore, German patent document DE 695 11 772 T2 and PCT International patent document WO 02/005 935 A2 disclose prior art arrangements. The last-mentioned document shows a rotary filter in the case of which a pump is required for pumping out permeate from a container.

Exemplary embodiments of the invention are related to a filtration arrangement having a structurally simple and reliable construction.

According to one aspect of the invention, a plurality or many of the membrane filter disks are disposed so as to be axially spaced apart on each hollow shaft and spacer sleeves, which mutually space apart the membrane filter disks axially from one another on the hollow shafts, are disposed between part of or all of the neighboring membrane filter disks. This design enables a very simple arrangement of the membrane filter disks on the hollow shafts.

It is moreover preferably provided that a pretension, on the spacer sleeves, is chosen such that the spaces sleeves deform such that the internal circumference of the latter in the region of the corners, or of the largest external diameter, respectively, is pushed onto the external circumference of the non-circular hollow shafts such that the arrangement from axially stacked membrane filter disks is, in a manner that is particularly simple in constructive terms and advantageously reliable, tightly clamped in a rotationally secured manner on the hollow shafts.

Particularly advantageously, an integral spacing sleeve can thereby be used instead of a sleeve designed as a composite of multiple parts.

According to one particularly advantageous variant of the invention, the spacer rings are composed of a deformable, in particular preferably from an elastic deformable material. It is further preferable herein for the spacer rings to be composed of a visco-plastic material. In such a manner, a slight deformation of the spacer sleeves in the installed position on the hollow shafts can thus be advantageously utilized for disposing the membrane filter disks in a rotationally fixed manner on the hollow shafts. To this end, it is additionally advantageous for the hollow shafts to have a non-circular, in particular an angular, external cross section. The spacer rings may have an identical axial thickness, or optionally also in any case at intervals have dissimilar thicknesses in order for tolerances on the membrane filter disks to be optionally equalized in such a manner. This optionally saves post-grinding or grinding of the membrane filter disks in order for the latter to be brought to a very uniform thickness.

It is furthermore advantageous herein for the hollow shafts to be aligned so as to be mutually parallel, and for the hollow shafts to be spaced apart in such a manner, and for the membrane filter disks to be disposed axially on the hollow shafts such that the membrane filter disks overlap in a radial manner on the hollow shafts. Advantageous flow conditions for a membrane filtration in the container are thus generated in a simple manner in this way.

It is furthermore simple in terms of construction and advantageous for the membrane filter disks to have, in each case, radially extending permeate ducts and/or an annular gap, the permeate ducts and/or annular gap being configured so as to be open in a radially inward manner, and the permeate ducts and/or the annular gap, or the annular gaps, respectively, in an inward manner toward the hollow shaft to open into, in each case, at least one axially running axial duct on the external circumference of the respective hollow shafts.

It is moreover preferred herein that the axial ducts extend, in each case, across the entire or in any case the major part of the axial portion of the hollow shafts that is disposable within the container, so as to be able to dispose as many of the membrane filter disks as possible in this region.

According to another preferred design embodiment, which advantageously refines the manner in which the permeate is discharged from the membrane filter disks, the axial ducts can, in each case, be provided with one or a plurality of axially spaced apart, radially extending bores that open into a longitudinal duct within the respective hollow shafts. It is moreover preferable for the longitudinal duct to, in each case, preferably extend across the entire length of the hollow shafts and to be disposable, or disposed, respectively, in portions within the container and in portions outside the container.

In terms of construction it is furthermore simple and reliable for the hollow shafts to have a diameter enlargement, in particular a collar or a sleeve attachment, and in such a manner axially close the axial ducts in a first direction. It is furthermore advantageous herein for, in each case, one covering installation to be provided on the ends of the hollow shafts that are disposable in the container, the covering installation closing the axial duct or ducts in this direction.

The hollow shafts can, in each case, be externally configured so as to be typically polygonal across the axial length on which the arrangements from axially stacked membrane filter disks and from the spacer sleeves are disposed on the hollow shafts, depending on the number of axial ducts.

According to one refinement, which is preferred and is very advantageous, the spacing of the non-circular regions, in particular of corners, of the hollow shafts, and the internal radius of the spacer sleeves and of the membrane filter disks is chosen and adapted in such a manner that the spacer sleeves and the membrane filter disks in the assembly are initially capable of being placed onto the corners of the hollow shafts by way of a loose fit, such that in a state of final assembly almost linear bearing regions are configured in the region of the corners between the external circumference of the hollow shafts and the internal circumference of the spacer sleeves and of the membrane filter disks, wherein the axial ducts run between neighboring bearing regions.

According to one further constructive refinement, it is provided that the covering installations, by way of a spring, in particular one or a plurality of disk springs, act axially with a, or the, pretensioning force on the respective arrangement from axially stacked membrane filter disks and from the spacer sleeves. The pretensioning is advantageously preferably chosen in such a manner that the spacer sleeves slightly deform such that the internal circumference of the latter in the region of the corners, or of the largest external diameter, respectively, is pushed onto the external circumference of the non-circular hollow shafts, such that the arrangement from axially stacked membrane filter disks and from the spacer sleeves is tightly clamped in a rotationally secured manner on the hollow shafts. On account of the preferably visco-plastic spacer rings, the clamping force can be transmitted to the membrane filter disks in a very uniform and gentle manner, the membrane filter disks typically being configured so as to be unpolished and rather rough.

According to another refinement, a rotatable pump disk forming part of a centrifugal pump arrangement for pumping permeate is disposed or configured at that end of each rotatable hollow shaft that projects from the container. Pumping of permeate from the container by way of membrane filter disks and the hollow shafts up to a discharge is readily implementable in such a manner. A separate pump such as, for example a vacuum pump, which increases the constructive effort is not required. The drive device for rotating the hollow shafts having the membrane filter disks moreover also drives the centrifugal pump.

It is expedient and particularly simple in constructive terms, when at least two of the pump disks or even all of the pump disks, are disposed in a common discharge container on the ends of the hollow shafts that are, in each case, disposable outside the container. It is advantageous herein for the discharge container to have a discharge, and otherwise to be configured so as to be sealed and to be attached to the machine frame.

According to one refinement, which can also be considered as a separate invention, it is advantageous for the hollow shafts to be mounted outside the container so as to be rotatable in a machine housing forming the machine frame. A machine housing is advantageous since the latter, in particular as a metal casting, is configured in a simple manner and in a stable design.

It is advantageous for the machine housing to have an external shell and one or a plurality of radial collars extending from the external shell radially inward, and that one or two of the radial collars serve(s) for rotatably mounting the hollow shafts, in each case by way of bearing installations, in particular by way of two axially spaced apart roller bearings, in the machine housing. This contributes to a stable and compact design.

The machine housing herein can receive or surround in a framing manner, respectively, at least one drive motor, one drive connection to the hollow shafts, preferably a wrap belt drive, and bearing installations, such that the components are well protected.

BRIEF DESCRIPTION OF THE INVENTION

The invention will be described in more detail hereunder by means of exemplary embodiments with reference to the drawing in which:

FIG. 1 in a) shows a sectional illustration of a filtration arrangement according to the invention for a filtration device, in b) shows an enlargement of a fragment from a), in c) shows a section perpendicular to that of a) along the line A-A, and in d) shows a section perpendicular to that of a) along the line B-B;

FIG. 2 in a) shows a section, perpendicular to that of FIG. 1, of a part-region of a filtration arrangement in the manner of FIG. 1, having a drive device that is visible in this section; in b) shows an enlargement of a fragment from a), and in c) shows a section perpendicular to that of a) along the line C-C.

DETAILED DESCRIPTION

Figures 1A, 1B:
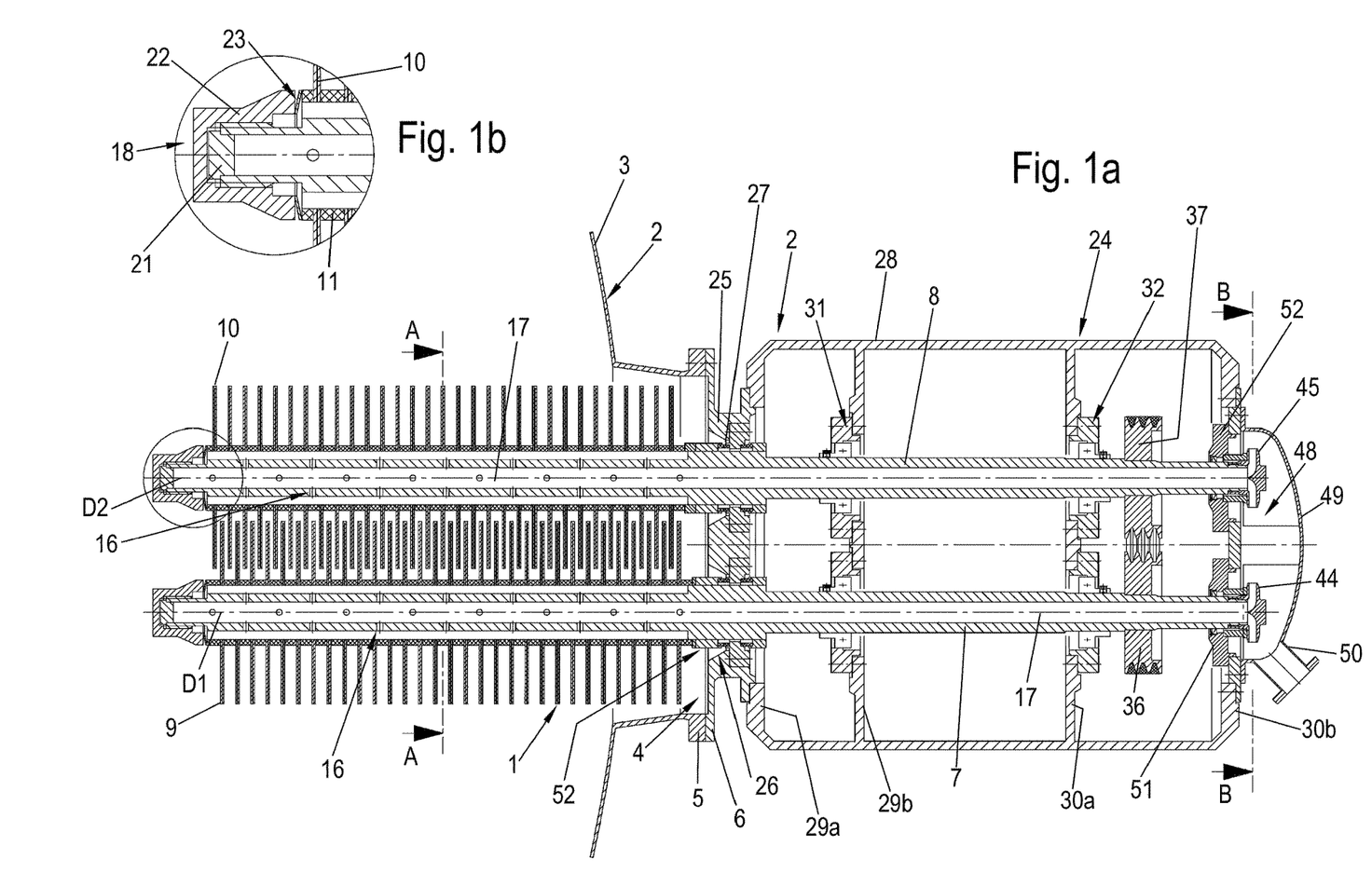
Figure 1C:
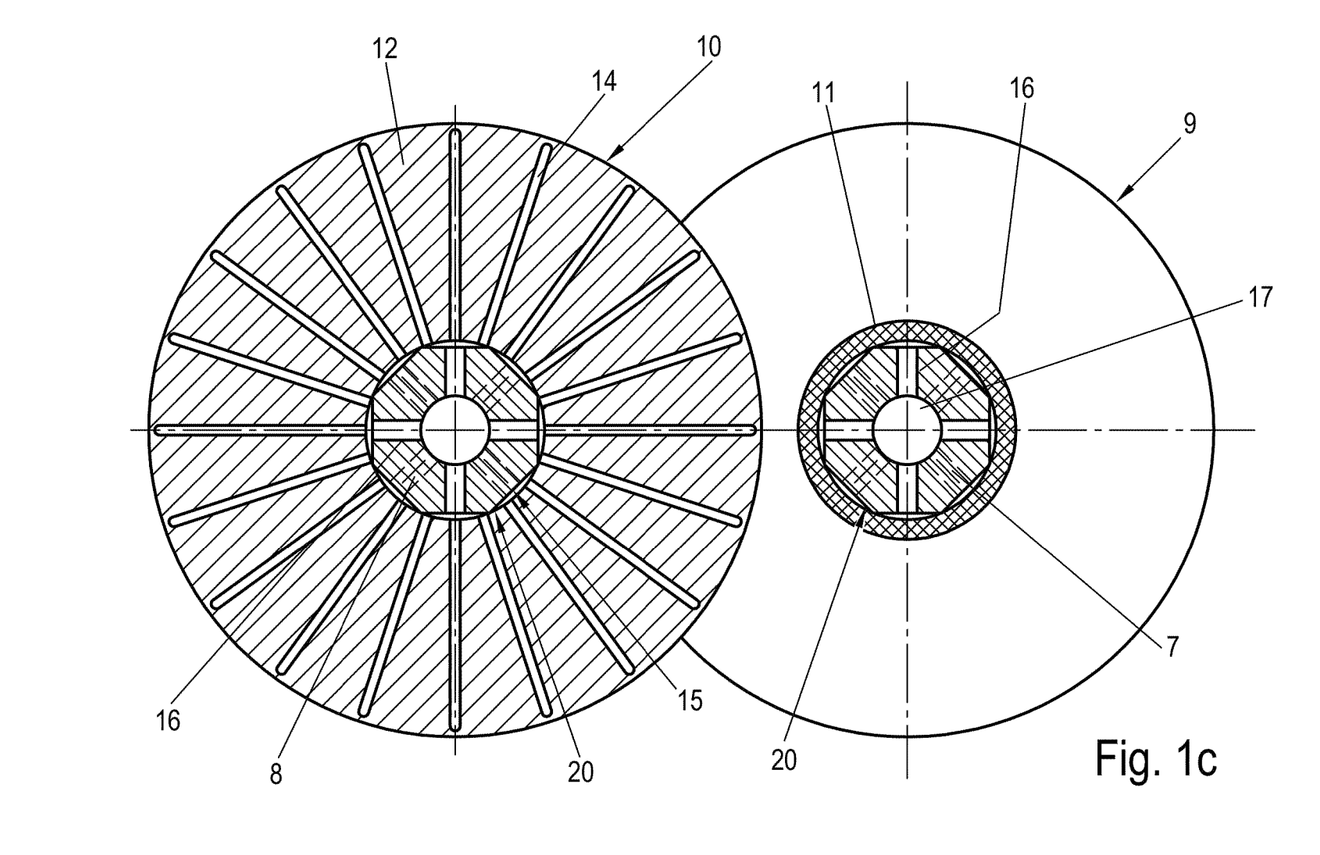
Figure 1D:
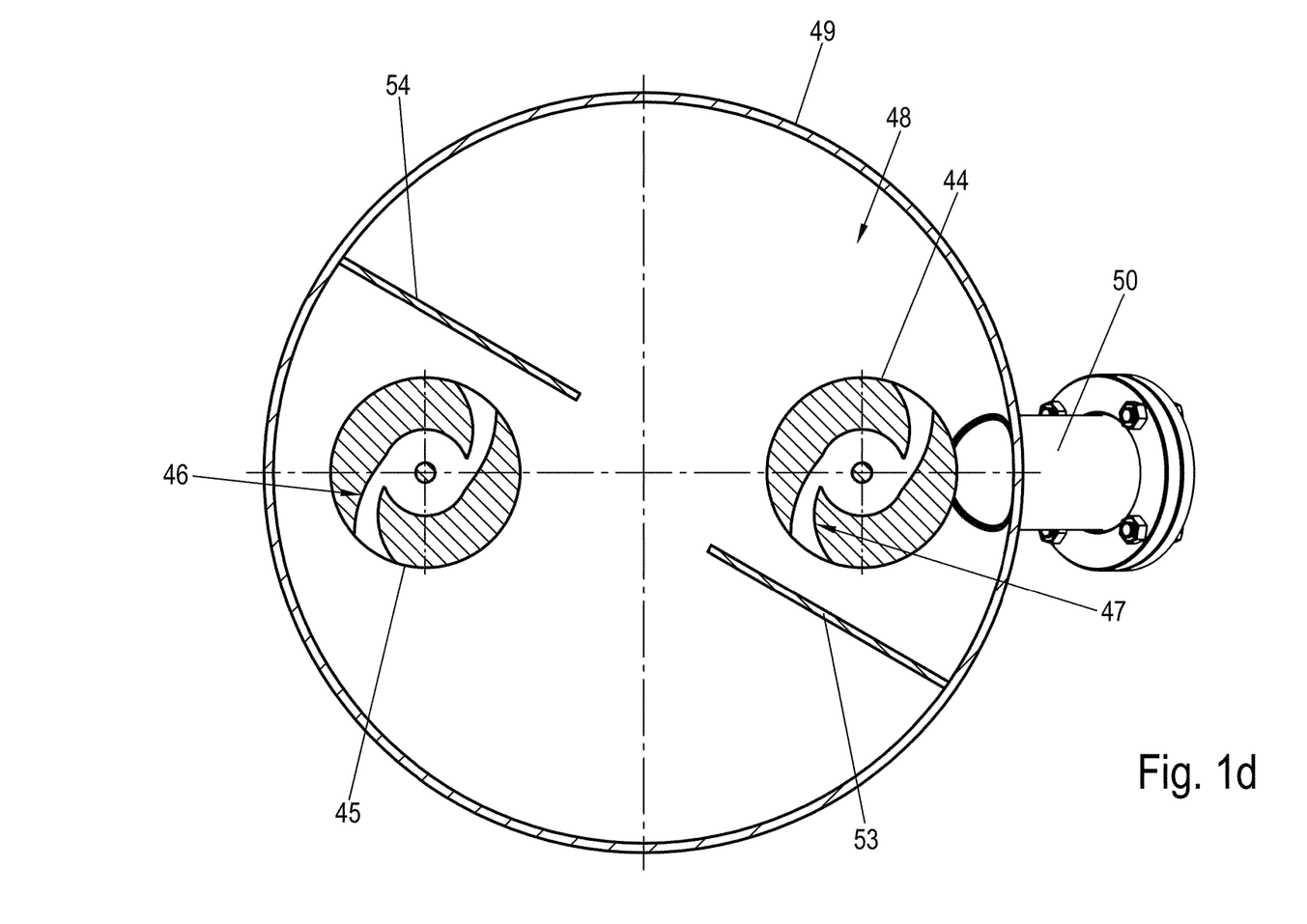
Figures 2A, 2B:
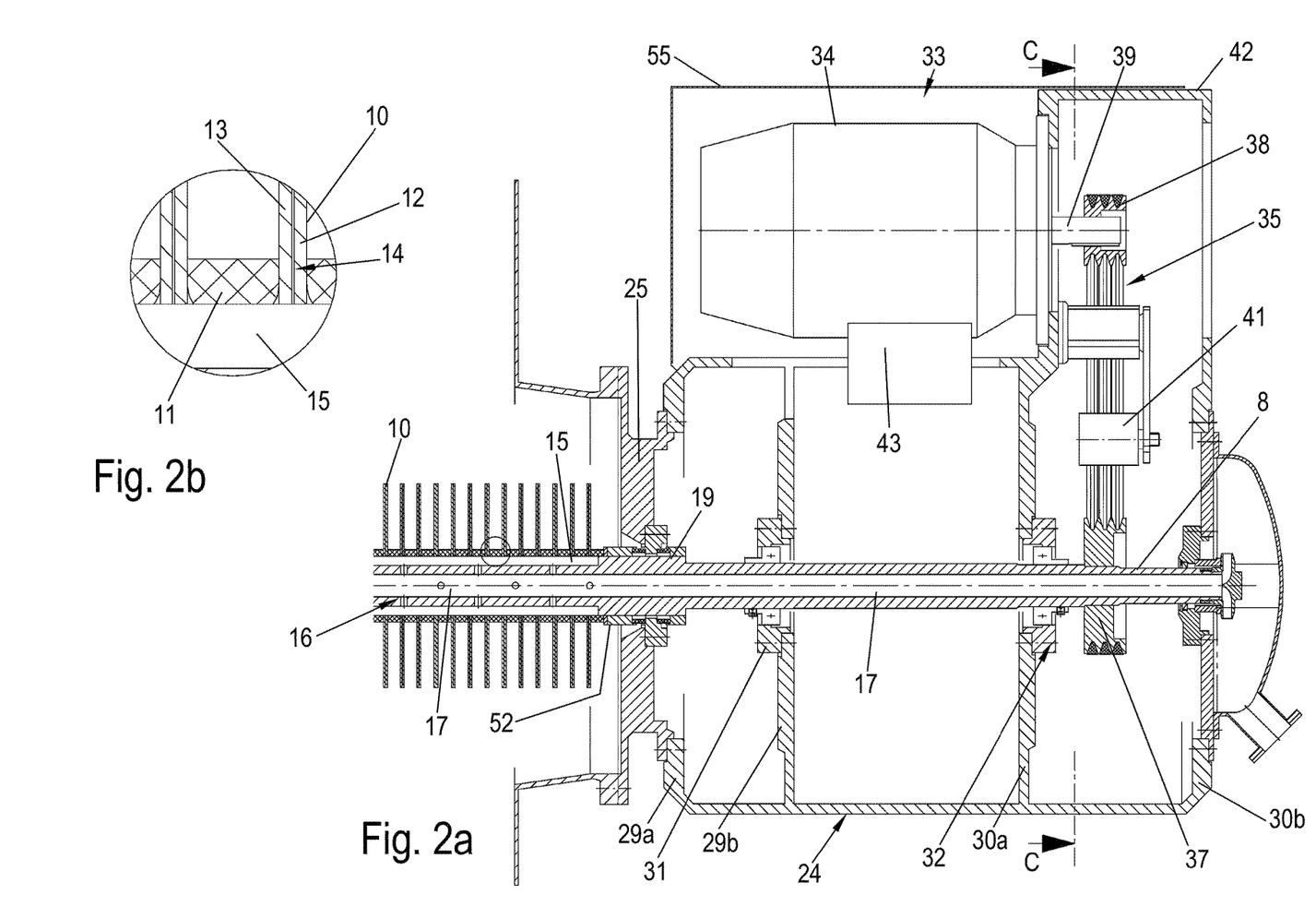
Figure 2C:
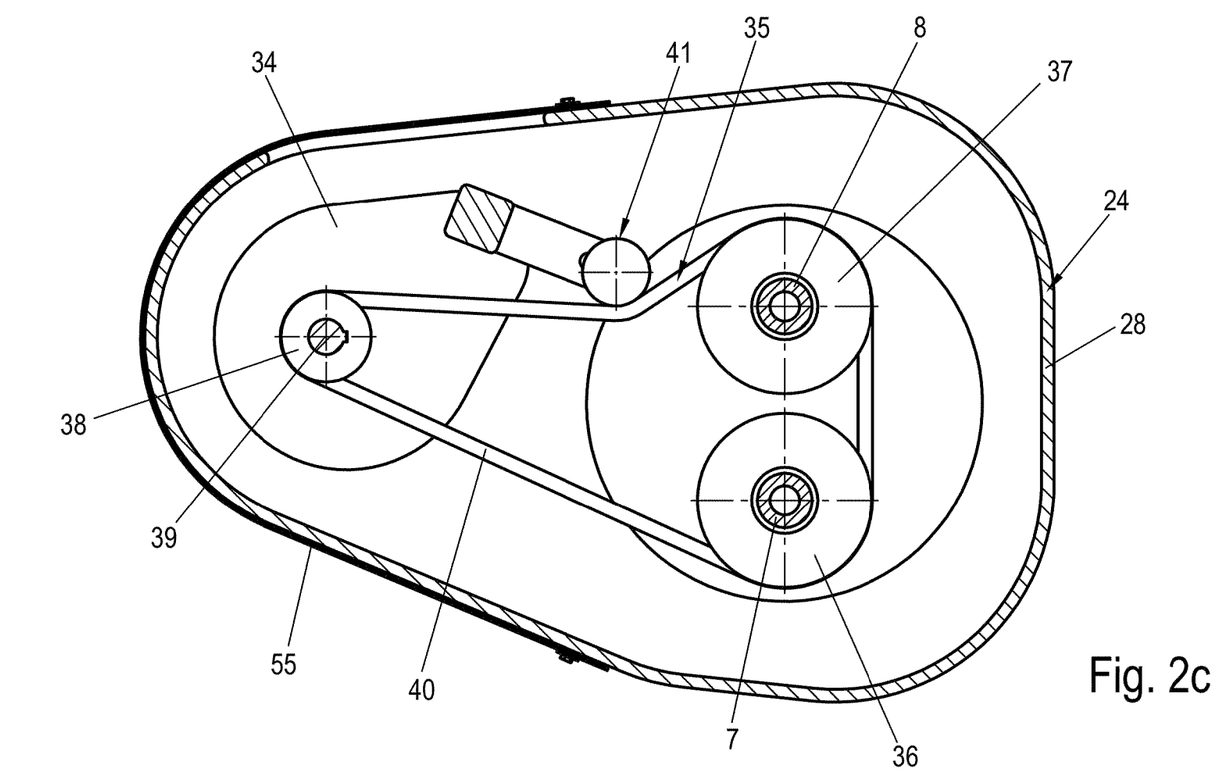

FIGS. 1 and 2 show various sectional views of a filtration arrangement 1 for a filtration device 2 (depicted only in portions here). This filtration device 2 is typically part of a superordinate manufacturing plant (not illustrated here) for producing a product.

The filtration device 2 has a container 3, illustrated only in portions here, for receiving one or a plurality of the filtration arrangements 1 and a suspension to be filtered. The container 3 is provided with at least one inlet and at least one outlet (neither being illustrated here). The container 3 also has at least one opening 4, which is provided with a flange 5. An assembly flange 6, of one of the filter arrangements 1, that is of a corresponding configuration is capable of being assembled on the flange 5. This assembly is preferably performed by means of screws (not illustrated here) that penetrate the flange. Each container 3 preferably has only a single opening 4, and only a single one of the filtration installations 1 is assembled on each container 3. However, it is also conceivable for a plurality of the openings 4 to be provided on one container 3, and for a plurality of the filtration arrangements 1 to be assembled.

In the context of this description, at least one filtration arrangement 1 or a plurality of the filtration arrangements 1, and at least one of the containers 3, conjointly form a or the filtration device 2, respectively.

The at least one supply line (not illustrated here) serves for supplying a flowable suspension to be filtered into the container 3. Either the same supply line, or a further supply line, in contrast enables a cleaning liquid for carrying out a cleaning, in particular a CIP cleaning, to be directed into the container 3. An optional further supply line enables the container 3 to be impinged with air or gas, in particular inert gas, optionally pressurized (neither illustrated here).

The filtration arrangement 1 is configured as a membrane filtration arrangement. The filtration arrangement 1 has at least two or more rotatable hollow shafts 7, 8. An arrangement having two of the hollow shafts 7, 8 is preferred, since the arrangement is of compact construction but nevertheless operates very positively.

According to FIGS. 1 and 2, the rotation axes D1 and D2 of the hollow shafts 7, 8 are in each case horizontally aligned. This alignment is preferred since it ensures a simple assembly of the filtration installation on or in the container, respectively. However, another orientation of the hollow shafts 7, 8 in the space is also conceivable, in particular an oblique alignment, or a vertical alignment (not illustrated here).

In each case, a plurality of or many membrane filter disks 9, 10 are disposed on the hollow shafts 7, 8. The membrane filter disks 9, 10 are disposed so as to be axially mutually spaced apart on the hollow shafts 7, 8. Spacer sleeves 11, which mutually space apart the membrane filter disks 9, 10 axially on the hollow shafts 7, 8, are disposed between the membrane filter disks 9, 10 (cf. in particular FIGS. 1b and 2b).

The hollow shafts 7, 8 are preferably aligned so as to be mutually parallel. The hollow shafts 7, 8 are spaced apart in such a manner, and the membrane filter disks 9, 10 are disposed axially on the hollow shafts 7, 8 such that the membrane filter disks 9, 10 overlap in a radial manner on the two hollow shafts 7, 8. That is to say that the membrane filter disks 9, 10 mutually engage in an alternating overlapping manner on the two hollow shafts 7, 8, wherein the membrane filter disks 9, 10 do not contact one another. During operation, when hollow shafts 7, 8 rotate, an advantageous flow facilitating the filtration is generated in the suspension in the container 3.

The membrane filter disks 9, 10 are preferably composed from ceramics. The membrane filter disks 9, 10 furthermore preferably have a two-layered construction (cf. FIGS. 1*b* and 2*b*), wherein radially extending permeate ducts 14 and/or a preferably circumferentially closed annular gap are/is configured between the two upper and lower ceramics layers 12, 13. In a radially outward manner, the permeate ducts 14 or the annular gap, are/is closed by the ceramics layers 12, 13 that are interconnected at least in a radially more distant outward manner. In the filtration, the filtered liquid, the permeate, penetrates the ceramics layers and is discharged by way of the permeate ducts and/or the annular gap. The unfiltered retentate remains in the container 3. Depending on the application, extracted liquid volume in the container 3 can optionally also be refilled over a specific period of time by adding suspension or optionally another liquid, or the receding liquid volume in the container 3 can be superimposed by way of a suitable gas.

The permeate ducts 14 and/or a respective annular gap are/is configured so as to be open in a radially inward manner. The permeate ducts 14 and/or the annular gap, or the annular gaps, respectively, in an inward manner toward the hollow shafts 7 or 8, respectively, in each case, open into at least one axially running axial duct 15 on the external circumference of the respective hollow shafts 7, 8. The axial ducts 15 preferably extend, in each case, across the major part of the axial portion of the hollow shafts 7, 8 that lies within the container 3.

The axial ducts 15 are, in each case, provided with one or a plurality of axially spaced apart, radially extending bores 16 that open into a longitudinal duct 17 within the respective hollow shafts 7, 8. The hollow shafts 7, 8 serve as discharge ducts for the permeate. The longitudinal duct 17 preferably extends, in each case, across the entire length of the hollow shafts 7, 8 and thus in portions lies within the container 3 and in portions lies outside the container 3. The hollow shafts 7, 8, and the longitudinal duct 17 running axially therein, in this manner penetrate the opening 4 of the container 3.

The hollow shafts 7, 8, in relation to the opening 4 of the container 3, have a diameter enlargement or a sleeve attachment 19, and axially close the axial ducts 15 in this direction. In each case, one covering installation 18 is provided on the free ends of the hollow shafts 7, 8 that face away from the opening in the container 3. The covering installation 18 closes the axial duct or the axial ducts 15 in this direction. The covering installation 18 can be configured as a screw-fit covering and can be screw-fitted to a threaded portion on the respective hollow shaft 7, 8.

The spacer rings 11 are preferably composed of an elastic material. The elasticity of the material should not be excessive such that this material to this extent can also be referred to as a visco-plastic material.

Toward the opening 4, the membrane filter disks 9, 10 and the spacer sleeves 11 are supported on the radially projecting sleeve attachment 19 on the hollow shafts 7, 8. From the other side, the covering installations 18 as coverings and clamping installations press axially onto the arrangements from axially stacked membrane filter disks 9 or 10, respectively, and from the spacer sleeves 11.

In order for the arrangements from axially stacked membrane filter disks 9 or 10, respectively, and from the spacer sleeves 11 to be centered on the respective hollow shaft or hollow shafts, it is advantageous, according to one variant, for the hollow shafts 7, 8 to not have a round external cross-section but a non-circular, in particular an angular, external cross-section.

The hollow shafts in this instance are preferably configured so as to be non-circular in each case across the axial length on which the arrangements from axially stacked membrane filter disks 9 or 10, respectively, and from the spacer sleeves 11 are arranged on the hollow shafts. The hollow shafts can be configured, for example, so as to be oval. Depending on the number of axial ducts, the hollow shafts on the external circumference thereof in this portion are in particular typically polygonal in the cross-section. According to FIG. 2*b*, the hollow shafts 7, 8 across the axial length on which the arrangements from axially stacked membrane filter disks 9 or 10, respectively, and from the spacer sleeves 11 are disposed on the hollow shafts are in any case octagonal in the cross-section.

The external radius herein on account of the corners of the hollow shafts (this in the case of an oval cross section accordingly being the largest diameter) is preferably chosen in such a manner that the spacer sleeves 11 and the membrane filter disks 9, 10, which on the internal circumference thereof are preferably circular, having an internal circumference that permits the spacer sleeves 11 and the membrane filter disks 9, 10 in the assembly to be initially assembled on the corners with a loose fit, such that almost linear bearing regions 20 are configured in the region of the corners between the external circumference of the hollow shafts 7, 8 and the internal circumference of the spacer sleeves 11 and of the membrane filter disks 9, 10, wherein the axial ducts 15 are created between neighboring linear bearing regions 20 (cf. FIG. 1*c*).

The covering installations 18 preferably have a plug 21 (cf. FIG. 1*b*) by way of which the respective longitudinal duct 17 in the hollow shafts 7, 8 is axially closed. The covering installations 18 furthermore have a covering cap 22 overlapping the respective end of the hollow shafts 7, 8 and the plug 21. These covering caps 22 are preferably configured as screw-fit caps, which are screw-fittable on a threaded portion at the end of the hollow shafts 7, 8 in the container 3. The covering caps can act in a direct axial manner, or by way of a spring 23, for example a type of spring ring, in particular one or a plurality of disk springs, on the respective arrangement from axially stacked membrane filter disks 9 or 10, respectively, and from the spacer sleeves 11.

In this manner, a pretension parallel with the rotation axes D1, D2 can be built up, advantageously in an adjustable manner. This serves for building up/applying a defined pretension or pretensioning force, respectively, on the respective arrangement from axially stacked membrane filter disks 9 or 10, respectively, and from the spacer sleeves 11, which are supported on the other side on the collar or on the sleeve attachment 19 as a diameter enlargement on the hollow shafts 7, 8.

The pretensioning force is chosen in such a manner that the spacer sleeves 11, in particular preferably in an elastic manner deform such that the internal circumference thereof in the region of the corners or of the largest external diameters, respectively, is pushed onto the external circumference of the non-circular hollow shafts 7, 8. In this manner, the entire assembly from axially stacked membrane filter disks 9 or 10, respectively, and from the spacer sleeves 11 is tightly clamped in a simple but nevertheless reliable manner so as to be rotationally secure on the hollow shafts 7, 8.

Two or more, in particular two to ten, of the hollow shafts described above are preferably provided per filtration device 2. The above explanation of the construction of the hollow shafts 7, 8 thus refers preferably to 2 or more of the hollow shafts 7, 8, wherein, in each case, preferably two of the hollow shafts, or more specifically two or more of the membrane filter disks 9, 10 disposed on the hollow shafts, overlap one another radially.

The hollow shafts 7, 8 are mounted outside the container 3 so as to be rotatable in a machine housing 24. This will be explained in more detail below.

The machine housing 24 is herein a preferred design embodiment configured as a metal casting. This manner of the design embodiment is readily implementable, but nevertheless stable and cost-effective.

The machine housing 24 in the cross-section here (cf. FIG. 2c) in an exemplary manner has an approximately triangular geometry and in this manner is conceived so as to be stable.

The machine housing 24 is directly or by way of a flange plate 25, having the flange 6 and having one or a plurality of lead-throughs 26 for the hollow shafts 7, 8, flange-fitted to the container 3. Herein, one or a plurality of single-part or multiple-part seal arrangements 27 can be configured on the external circumference, for example on the diameter enlargement, of the hollow shafts 7, 8, so as to configure in each case a sealed rotary lead-through for the respective hollow shafts 7, 8 on the opening 4, in particular on the flange plate 25.

The machine housing 24 preferably has an external shell 28 and one or a plurality of radial collars 29a,b and 30a,b that extend radially inward from the external shell 28 (each radial collar here has one internal, preferably circular, lead-through for the hollow shafts).

One or two of these radial collars 29b, 30a preferably serve for mounting the hollow shafts 7, 8 in each case by way of bearing installations 31, 32, in particular having two axially spaced apart roller bearings, so as to be rotatable in the machine housing 24 (FIG. 1a).

Each of the hollow shafts 7, 8 is rotatable by a drive device 33 (cf. FIGS. 1a, 2a, and 2c). This will be explained in yet more detail below. A drive device having an in particular electric drive motor 34 and preferably a wrap drive, in particular a belt drive 35, as a drive connection to the hollow shafts 7, 8 is preferably implemented.

The belt drive 35, or the drive belts 40 thereof, in particular V-belts, wraps belt pulleys 36, 37, 38 on the hollow shafts 7, 8 and on a drive shaft 39 of the drive motor 34 (cf. FIG. 2c). The belt pulleys 36, 37 can be disposed outside the container 3 on any axial location on the hollow shafts 7, 8. Here, the belt pulleys 36, 37 are disposed in relation to the container 3 so as to be on that side of the hollow shafts 7, 8 that axially faces away from the bearing installations 31, 32, however could also be disposed between the bearing installations 31, 32.

A tensioning installation 41 can act in a tensioning or resilient manner, respectively, on the belt drive 35 or on the actual belt 40, respectively.

The drive motor 34 is preferably attached to a portion 42 of the machine housing 24 that is lateral to the hollow shafts 7, 8. The drive motor 34 in this region can be covered by a hood 55, or in portions be exposed. An optional terminal box 43 contains electrical terminals for the drive motor 34.

It is advantageous for the machine housing 24 to receive at least the drive motor 34, the drive connection to the hollow shafts 7, 8, and the bearing installations 31, 32 for the hollow shafts, or at least surrounds the latter in a substantially framing manner by way of the external shell 28, such that these components are well protected.

A discharge installation having a centrifugal pump is configured at the ends of the hollow shafts 7, 8 that are outside the container 3 (cf. in particular FIGS. 1a and 1d). This discharge installation, on each hollow shaft, is preferably composed of, in each case, at least one pump disk 44, 45, preferably, in each case, placed on the axial ends of the hollow shafts 7, 8, and having at least one or two or more transverse duct 46, 47 that in a radial plane from the axial longitudinal ducts 17 run(s) to the outside in a manner so as to be angularly oblique to the respective radial direction.

The pump disks 44, 45 in this manner form pump wheel arrangements by way of which permeate is pumped. In operation, with reference to FIG. 1d, a rotation of the hollow shafts in the clockwise direction is implemented. The pump disks 44, 45 are disposed within a discharge chamber 48. This discharge chamber 48 here is formed from a discharge container 49 having at least one discharge 50, the container being attached to the machine housing 24. The pump disks 44, 45 are disposed in the discharge chamber as the pump chamber 48. The pump chamber 48 is furthermore, preferably by disks 51, 52 on which the hollow shafts 7, 8 in the manner of rotational lead-through and preferably sealed by way of rotating mechanical seals, are routed out of the machine housing 24. The discharge container 49 is preferably configured in the manner of a tub and by way of the open side thereof is assembled on the machine housing 24, in particular flange-fitted to the latter.

The discharge 50, depending on requirements, can be configured at various locations of the discharge container 49, according to one variant thus at the lowest location on the container in the installed position, or at such a high location that the aforementioned rotating mechanical seals do not become dry when in operation.

One or a plurality of ribs 53, 54 that are intended to prevent the pump disks 44, 45 disadvantageously influencing one another in fluidic terms can be provided in the discharge chamber 48, in particular in the discharge container 49.

In operation, the container 3 is filled with a flowable suspension. The hollow shafts 7, 8 are thereafter set in rotation. In this manner, liquid is suctioned through the ceramics layers 12, 13 into the permeate ducts 14, the liquid flowing from there into the axial ducts 15 and into the bores 16, into the two longitudinal ducts 17, and from there through the pump disks 44, 45, having the transverse ducts 46, 47, into the discharge chamber 48 from where the permeate flows out through the discharge 50.

It is to be noted that the following ranges have proven particularly successful for achieving positive filtration results:

- the membrane filter disks 9, 10 preferably have a diameter of 50 to 500 mm, particularly preferably a diameter of 200 to 400 mm;
- the circumferential speed in operation on the external circumference of the membrane filter disks 9, 10 is preferably 5 to 50 m/sec; and/or
- the number of hollow shafts per filtration arrangement is preferably two to ten;
- the number of membrane filter disks 9, 10 per hollow shaft is preferably 10 to 250 units, in particular 40 to 150 units.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

LIST OF REFERENCE SIGNS

Filtration arrangement 1
Filtration device 2
Container 3
Opening 4
Flange 5
Assembly flange 6
Hollow shafts 7, 8
Membrane filter disks 9, 10
Spacer sleeves 11
Ceramics layers 12, 13
Permeate ducts 14
Axial duct 15
Bores 16
Longitudinal duct 17
Covering installations 18
Collar 19
Bearing regions 20
Plug 21
Covering caps 22
Spring 23
Machine housing 24
Flange plate 25
Lead-through 26
Seal assemblies 27
External shell 28
Radial collars 29, 30
Bearing installations 31, 32
Drive device 33
Drive motor 34
Belt drive 35
Belt pulleys 36, 37, 38
Drive shaft 39
Drive belt 40
Tensioning installation 41
Portion 42
Terminal box 43
Pump disks 44, 45
Transverse duct 46, 47
Discharge chamber 48
Discharge container 49
Discharge 50
Disks 51, 52
Ribs 53, 54
Hood 55
Rotation axes D1, D2

The invention claimed is:

1. A filtration arrangement for a filtration device having a container, the filtration arrangement comprising:
   a plurality of hollow shafts rotatably mounted in a machine frame; and
   a plurality of membrane filter disks disposed on the plurality of hollow shafts, wherein the plurality membrane filter disks are disposed axially spaced apart on each of the plurality of hollow shafts; and
   deformable spacer sleeves, which axially mutually space apart the plurality of membrane filter disks on the plurality of hollow shafts, are disposed between part of or all of a neighboring membrane filter disks,
   wherein the plurality of hollow shafts are coupled to at least one drive device;
   wherein the plurality of hollow shafts are configured to discharge permeate from the container,
   wherein an end of each of the plurality of hollow shafts on which the plurality of membrane filter disks are disposed is introducible into the container such that opposite ends of the hollow shafts project externally from the container,
   wherein the plurality of hollow shafts are non-circular,
   wherein an external cross-section of each of the plurality of hollow shafts defines a regular polygon, and
   wherein the deformable spacer sleeves are pretensioned such that the deformable spacer sleeves deform such that an internal circumference of the deformable spacer sleeves, in a region of corners or of a largest external diameter of a respective one of the plurality of hollow shafts, are pushed onto an external circumference of the plurality of hollow shafts such that the axially spaced apart plurality of membrane filter disks are tightly clamped in a rotationally secured manner on the plurality of hollow shafts.

2. The filtration arrangement of claim 1, wherein the deformable spacer sleeves comprise an elastically deformable material.

3. The filtration arrangement of claim 2, wherein the deformable spacer sleeves comprise a visco-plastic material.

4. The filtration arrangement of claim 1,
   wherein the plurality of hollow shafts are mutually parallel, and
   wherein the plurality of hollows shafts are spaced apart in such a manner, and the plurality of membrane filter disks are disposed axially on said hollow shafts such that, the plurality of membrane filter disks overlap in a radial manner on the plurality of hollow shafts.

5. The filtration arrangement of claim 1, wherein each of the plurality of membrane filter disks has radially extending permeate ducts or an annular gap, wherein the permeate ducts or annular gap of each of the plurality of membrane filter disks are/is configured to be open in a radially inward manner, and the permeate ducts or the annular gap of each of the plurality of membrane filter disks open into, in an inward manner toward the plurality of hollow shafts, at least one axially running axial duct on the external circumference of a respective one of the plurality of hollow shafts.

6. The filtration of claim 5, wherein an axial length of the plurality of hollow shafts on which the plurality of membrane filter disks and the deformable spacer sleeves are disposed is non-circular.

7. The filtration arrangement of claim 6, wherein the plurality of hollow shafts are polygonal across an axial length on which the plurality of membrane filter disks and the deformable spacer sleeves are disposed.

8. A filtration device, comprising:
a container; and
a filtration arrangement, which comprises
a plurality of hollow shafts rotatably mounted in a machine frame; and
a plurality of membrane filter disks disposed on the plurality of hollow shafts, wherein the plurality membrane filter disks are disposed axially spaced apart on each of the plurality of hollow shafts; and
deformable spacer sleeves, which axially mutually space apart the plurality of membrane filter disks on the plurality of hollow shafts, are disposed between part of or all of neighboring membrane filter disks,
wherein the plurality of hollow shafts are coupled to at least one drive device;
wherein the plurality of hollow shafts are configured to discharge permeate from the container,
wherein an end of each of the plurality of hollow shafts on which the plurality of membrane filter disks are disposed is arranged in the container such that opposite ends of the hollow shafts project externally from the container,
wherein the plurality of hollow shafts are non-circular,
wherein an external cross-section of each of the plurality of hollow shafts defines a regular polygon, and
wherein the deformable spacer sleeves are pretensioned such that the deformable spacer sleeves deform such that an internal circumference of the deformable spacer sleeves, in a region of corners or of a largest external diameter of a respective one of the plurality of hollow shafts, are pushed onto an external circumference of the plurality of hollow shafts such that the axially spaced apart plurality of membrane filter disks are tightly clamped in a rotationally secured manner on the plurality of hollow shafts.

9. The filtration device of claim 8, wherein the machine frame is a machine housing, and wherein the plurality of hollow shafts are rotatably mounted outside the container so as to be rotatable in the machine housing.

10. The filtration device of claim 9, wherein the machine housing is a metal casting.

11. The filtration device of claim 8, wherein each of the plurality of membrane filter disks has radially extending permeate ducts or an annular gap, wherein the permeate ducts or annular gap of each of the plurality of membrane filter disks are/is configured to be open in a radially inward manner, and the permeate ducts or the annular gap of each of the plurality of membrane filter disks open into, in an inward manner toward the plurality of hollow shafts, at least one axially running axial duct on the external circumference of a respective one of the plurality of hollow shafts.

12. The filtration device of claim 11, wherein each of the plurality of hollow shafts includes an axial portion disposable in the container and an axial portion that is configured to be disposed outside of the container, wherein the axial ducts of each of the plurality of membrane filter disks respectively extend across a major part of the axial portion of each of the plurality of hollow shafts that is disposable within the container.

13. The filtration device of claim 12, wherein the plurality of hollow shafts are each provided with one or a plurality of axially spaced apart, radially extending bores which, proceeding from the axial ducts, open into a longitudinal duct within a respective one of the plurality of hollow shafts.

14. The filtration device of claim 13, wherein each of the longitudinal ducts extends across an entire length of each of the plurality of the hollow shafts and portions of which are disposable within the container and other portions of which are disposable outside the container.

15. The filtration device of claim 13, wherein each the plurality of hollow shafts has a collar or a sleeve attachment that axially closes the at least one axially running axial duct in a first direction on a first end of the respective one of the plurality of hollow shafts.

16. The filtration device of claim 15, further comprising:
one covering installation on the first end of the plurality of hollow shafts, wherein the covering installation closes the at least one axially running axial duct at the first end of the respective ones of the plurality of hollow shafts.

17. The filtration device of claim 16, wherein the covering installations, by way of one or a plurality of disk springs, act axially on the plurality of membrane filter disks and deformable spacer sleeves of each of the plurality of hollow shafts with the pretension.

18. The filtration device of claim 17, wherein the covering installations, by way of a covering cap screwed onto each of the plurality of the hollow shafts, and from the covering cap, by way of the one or the plurality of disk springs, act axially with the pretensioning force on the plurality of membrane filter disks and deformable spacer sleeves of each of the plurality of hollow shafts.

19. The filtration device of claim 15, wherein a rotatable pump disk, which forms part of a centrifugal pump arrangement for pumping permeate, is arranged at a second end, which is opposite of the first end, of each of the plurality of rotatable hollow shafts.

20. The filtration device as claimed in claim 19, wherein the rotatable pump disks of the plurality of hollow shafts are disposed in a common discharge container at the second ends of the plurality of hollow shafts.

21. The filtration device of claim 20, wherein the discharge container has a discharge and is sealed and attached to the machine frame.

22. The filtration device of claim 21, wherein the discharge container is a tub having one or more internal ribs.

23. The filtration device of claim 19, wherein the rotatable pump disks of the plurality of hollow shafts each have one or a plurality of discharge ducts running perpendicularly to a discharge duct in a respective one of the plurality of hollow shafts, in a manner oblique to a radial direction of the respective one of the rotatable pump disks.

* * * * *